United States Patent

Okumura et al.

[15] 3,677,410

[45] July 18, 1972

[54] SINTERED CHROMATOGRAPHIC PLATE AND METHOD FOR PRODUCING THE SAME

[72] Inventors: Tamotsu Okumura; Tetsuro Kadono, both of Osaka Pref., Japan

[73] Assignee: Shionogi & Co., Ltd., Osaka, Japan

[22] Filed: Jan. 28, 1971

[21] Appl. No.: 110,773

[30] Foreign Application Priority Data

Feb. 13, 1970 Japan....................................45/12864
March 14, 1970 Japan....................................45/21740
Dec. 29, 1970 Japan..................................45/126286

[52] U.S. Cl.............................................................210/198
[51] Int. Cl........................................................B01d 15/08
[58] Field of Search...........................................210/31, 198

[56] References Cited

UNITED STATES PATENTS 3,418,152  12/1968  Staudenmayer et al..............210/31 X Primary Examiner—Jim L. Decesare
Attorney—Wenderoth, Lind & Ponack

[57] ABSTRACT

A plate or thin-layer chromatographic element made by coating a refractory and chemically stable support with a dispersion of fine particles of chromatographically-active inorganic adsorbent and a powdered glass binder in liquid dispersing medium, removing the dispersing medium, and heating the coated layer to make it adherent and thereby to form a continuous, coherent and porous sintered-layer. Particles of the powdered glass contained in said sintered-layer hold a uniform distribution of the adsorbent particles and form firm bondings between each other and with the surface of the support without any detriment to the activity of the adsorbent. The element can withstand "visualization" techniques including charring with corrosive agents such as sulfuric acid and cannot be deactivated or destroyed even after repeated treatments for regeneration.

17 Claims, No Drawings

SINTERED CHROMATOGRAPHIC PLATE AND METHOD FOR PRODUCING THE SAME

BACKGROUND OF THE INVENTION

1. Field of the Invention

The present invention relates to new elements for plate or thin-layer chromatography and methods of producing them: in one of its aspects, it relates to a highly coherent chromatographic layer having excellent porosity which can be either self-supporting or bonded to a support which does not react with or absorb the developing (eluting) solvent. It can also serve for the improvement in the art of chromatography by introducing such a porous layer of exceptional durability, which withstands hot-spray treatment included in the technique called "visualization," assuring regeneration for repeated uses of the elements, and abrasion, guaranteeing the quality of the permanent record.

2. Description of Prior Art

Plate or thin-layer chromatographic techniques heretofore known in the art are becoming increasingly popular in analytical chemistry. Advantages included are simplicity, rapidity and applicability to a wide variety of separations. A large choice of adsorbents, ease of introducing other components such as fluorescing or complexing agents, and variation of conditions such as eluting solvent, present a number of parameters which may be manipulated to obtain the desired separation.

One major shortcoming standing in the way of a more widespread acceptance of thin-layer chromatography is the fragility and abrasion propensity of such prior art thin-layer chromatographic elements. Conventional chromatographic elements comprise a glass plate bearing a thin-layer of loosely adherent adsorbent-powder. They are available commercially, but since such performed layers are fragile, they are very prone to damage from the handling incident to packaging and shipping. Furthermore, they are inconvenient to store and generally unsuitable for record purposes because of their susceptibility to abrasion and breakage. Consequently the plates are more often coated by the user when needed.

Inconveniences encountered in such a case include the troublesome operations of blending the adsorbent and binder, dispersing the blend in a liquid dispersing medium, kneading the dispersed mixture into a slurry and applying it to the support in a homogenous layer. Insufficient homogeneity of the slurry and insufficient uniformity of the adsorbent layer, due to differences in the skill of the operators who prepare the elements, exert a considerable influence on the reproducibility of the experimental results.

Moreover, chromatographic elements which incorporate some organic substances such as starch, polyvinyl alcohol, agar-agar, or polyacrylamide as one of the binding ingredient, have the drawback that they cannot withstand thermal visualization with corrosive agents such as sulfuric acid, nitric acid, iodine, or bichromate-sulfuric acid. Although such corrosive agents are versatile non-specific reagents for visualization of colorless organic compounds, the visualization is not applicable to such a combination because the corrosive agent often chars the background of the developed spots. On the other hand, chromatographic elements which include gypsum as a binder cannot be used for the detection of active compounds which form sulfates or calcium salts.

SUMMARY OF THE INVENTION

It is therefore one object of the present invention to provide plate or thin-layer chromatographic elements, in the use of which the aforesaid various problems are extensively overcome, and which have the handling ease of a sheet of ordinary glass, metal, or ceramic, and an outstanding resistance to abrasion.

It is another object to provide such thin-layer chromatographic plates which can be treated with a corrosive agent, being convenient for the qualitative or quantitative detection of colorless organic compounds without any loss in quality of the resultant record.

It is a further object of the present invention to provide such thin-layer chromatographic plates which can withstand repeated uses and regeneration without any detriment to the chromatographic and handling properties.

It is still another object to provide firmly bonded, uniform, highly adsorbent chromatographic layers of high porosity and good reproducibility for preparative-scale chromatographic separation.

It is a still further object of the present invention to provide a method of producing plate or thin-layer chromatographic elements, which method assures that the produced plates will demonstrate an excellent abrasion resistance and the thin adsorbent layer will retain its ability to adsorb materials to be chromatographed even after the repeated uses and regenerations.

It is still another object of the present invention to provide a method of preparing strongly coherent and highly porous chromatographic layers which can be self-supporting or firmly adherent to a permanent support.

These and other objects of the present invention and attendant advantages thereof will be apparent to those who are skilled in the art to which the present invention pertains by the following detailed disclosure in the specification and the appended claims.

DESCRIPTION OF THE PREFERRED EMBODIMENTS

According to the preferred aspect of the present invention, there is provided a chromatographic element, adapted for use in plate or thin-layer chromatography, which comprises; a porous sintered layer of granulated glass on a support of refractory and chemically-stable material, which layer embraces or holds finely-divided and chromatographically-active inorganic adsorbent among its respective glass particles, the latter forming firm bondings to each other, to the adsorbent particles, and to the surface of the support.

The present invention also provides a preparative method for the aforesaid chromatographic element which comprises; mixing the inorganic adsorbent with powdered glass, kneading the mixture with a small amount of volatile solvent, applying and spreading the said kneaded mixture on the surface of the support, and then baking the whole at a temperature the same or higher than the melting-point where the glass beings to melt.

As the glass described in the foregoing paragraphs, soda-lime glass, borosilicate glass, high silicate glass, lead silicate glass and the like are exemplified. Although any kind of glass, as far as it has the property as a supercooled liquid, can meet with the object of the present invention, powdered glass having the same composition and physical properties as the support itself is generally preferred if a glass material is selected as support. In such case it is convenient to use glass powder having approximately the same particle size as that of the adsorbent. Thus, after crushing a portion of the glass support in a ball-mill, the powder is graded by elutriation and sieving, and the fraction suitable for the respective use is selected.

Lead silicate glass is sometimes preferred because its melting-point is much lower than that of the glass usually used as a support. Such a hybrid combination is often advantageous in that its preparation requires only moderate heating in the baking treatment, thus minimizing any possible deterioration in the chromatographic activity of the adsorbent and avoiding deformation of the support.

Any powdered adsorbent can be used, e.g., silica gel, alumina, diatomaceous earth, magnesium silicate and porous glass powder. Particle size of these inorganic adsorbents is usually selected as that most suitable for the intended use. Most of the commercially available adsorbents for thin-layer chromatography are advantageously used without modification.

Among these, silica gel is particularly suitable for the purpose, because its chromatographic activity does not deteriorate even after heating at or slightly above the melting-point of soda-lime glass, about 670° C.

This is confirmed by the following facts:
1. No difference is detected in the specific surface area and the particle size distribution of any silica gel tested before and after heating at 670° C for 7 minutes.
2. Chromatograms developed on usual thin-layer chromatographic plates, made by a conventional method using silica gel, undergone such heating up to 670° C, are in no way inferior to those on freshly prepared silica gel plates.
3. Photography of the sintered plate through a scanning electronic-microscope confirmed that the porous structure of the adsorbent was unchanged.

Said powdered glass and adsorbent are mixed together in a ratio of between 1:1 and 30:1, preferably from 2:1 to 10:1 by weight. Where the ratio of the adsorbent to the powdered glass is greater than 1, the binding force of particles in the layer is insufficient. On the other hand, a ratio less than 1:30 is not suitable because it leads to incomplete development. Typically, a weight of adsorbent 10 percent to 50 percent of the weight of the whole mixture produces advantageous results, although other ranges may be useful for particular combinations of adsorbent and eluting solvent.

There is a general tendency that the greater the ratio of the powdered glass to adsorbent, the higher the Rf value of the chromatogram developed with given solvent, the said Rf value being adjustable by lowering the polarity of said developing solvent. Therefore, separation of highly polar materials, which have hitherto been known to be very difficult in chromatography, can be effected on a plate of this invention, the activity of whose adsorbent is adjusted by varying the aforesaid ratio. This is one of the unexpected advantages of this invention.

The support can be made of any refractory and chemically-stable material; of glass, metal, or ceramic, and is formed into a plate, usually a rectangular strip. Glasses of a kind the same as or different from that of the glass powder are equally useful. Although titanium, stainless steel, aluminum, and the like are suitable examples of the chemically-stable metals, other metals such as iron, copper, and brass may also be used, with some restriction imposed by their chemical reactivity with the material to be chromatographed or with the developing solvent used. Steatite is one of the preferred ceramics.

According to the present invention, said mixture of the powdered glass and the adsorbent is kneaded after the addition of a small amount of volatile solvent (for instances, benzene, alcohol, acetone, water, or any mixture of them). The slurry thus formed is applied on and spread over the support with a conventional applicator. A thickness of the applied layer of 150 $\mu$ to 2 mm is suitable for plate or thin-layer chromatography.

In the illustrative examples described later, the slurry is applied on and spread over the surface of the support with an applicator set for a wet layer of 500 $\mu$ thick. The thickness of sintered layer actually formed on the support can be from ca. 200 $\mu$ to 300 $\mu$. When layers of such a thickness are used, Rf value deviation in the chromatogram is kept within the range of error of the developing operation.

Other auxiliary binding-agents may optionally be added to the said mixture of the present invention as long as they do not give any residue after baking. Such an addition may give said mixture a suitable solidity, consistency, or viscosity for the preparative process. Canada balsam, for example, having a strong adhesive property can preferably be added to said mixture, because it fulfils said various requirements and because the benzene used as its solvent has good volatility.

An aqueous solution of starch may also be available as the additive, but such an organic material sometimes stains or chars the sintered plate due to its carbonization. Similarly, polyvinyl alcohol, polyacrylamide, and the like are available in some cases. Where the sample to be chromatographed does not form an insoluble sulfate or a calcium salt, gypsum can be added without substantial difficulty, and is such a case, a relatively thick layer, up to 2mm, can be formed successfully.

However, the addition of such an auxiliary binding-agent is not essential, indeed, any volatile solvent, including water, can solely be used in the kneading. When water is used, infrared irradiation is very effective for the rapid evaporation of remaining water. A desirable property of the solvent is an ability to keep the spread-layer undisturbed until it is baked.

The layer having been applied and dried, is baked for a few minutes in an electric furnace at a temperature the same or slightly higher than the point at which the glass employed begins to melt. A suitable temperature is about 650°–700° C for ordinary soda-lime plate glass. If the temperature is too high, the whole layer melts and is destroyed, while if it is too low, no sintered-layer is formed. A baking time of about 10 minutes is sufficient to prepare a firmly bonded sintered-layer.

After baking, the plates are gradually cooled. Regardless of the fact that there is an approximately 10 fold difference between the thermal expansion coefficient of glass and that of adsorbent (for instance, the expansion coefficient of soda-lime glass is about $9.2 \times 10^{-6}$ while that of silica gel is about $5.4 \times 10^{-7}$), the particles to give the sintered-layer form firm and mutually melted bondings.

The sintered-layer of powdered glass which covers the plate support has a pure white sponge-like appearance with many small spaces or cavities, and it is believed that the adsorbent particles are held within said spaces or cavities without being densely packed together. This belief is also deduced from the fact that the chromatographic activity of the adsorbent is sufficiently retained even after the sintering or baking. Should the sintered-layer be such that the adsorbent particles are fully covered by the molten glass, the expected activity of adsorbent would presumably be lost.

In the following paragraphs, the present invention will be illustrated more specifically by way of example.

EXAMPLE 1

A. Preparation of the Plates for Chromatography

The glass of commercially available soda-lime support-plates for thin-layer chromatography is crushed in a ball-mill. After elutriation and sieving of the crushed product, there is obtained a fine glass powder having a particle size distribution; 1–2 $\mu$ (14 percent), 2–3 $\mu$ (23 percent), and 3–4 $\mu$ (18 percent), and with a specific surface area of 3.4 m²/g.

The glass powder is mixed with silica gel for chromatography (commercially available from Merck & Co., Inc. or from Yamani Chemicals Co., Ltd.) in various ratios as shown in Table 1, and the whole is kneaded, after adding Canada balsam (200 mg) and benzene (60 ml) to the solid mixture (20 g), to obtain a paste-like slurry. The slurry is applied on and spread over glass plates with a conventional application apparatus. The glass plates are of the same material as the glass powder. The dried plates are then baked at 680° C for 10 min. in an electric oven to give white sintered-layers of powdered glass with the adsorbent, silica gel.

B. Results of Developing and Separating Tests

In order to examine the separating ability of the plates thus prepared, a series of developing tests is done using three estrogens as reference materials to be chromatographed.

Conditions for ascending development
Temperature; 20° C (room temperature)
Solvent; benzene-ethyl acetate (2:)
Distance; 10 cm
Time; 18 – 21 min.
Origin; 2 cm from the bottom edge

TABLE 1

| Adsorbent and its ratio to powdered glass by weight | Estrone | RF value Estradiol | Estriol |
|---|---|---|---|
| Merck kiesel-1:1 | 0.67 | 0.55 | 0.09 |
| gel H 1:2 | 0.74 | 0.59 | 0.09 |
| 1:3 | 0.76 | 0.60 | 0.09 |
| 1:4 | 0.78 | 0.63 | 0.10 |
| Yamani layer 1:4 | 0.66 | 0.48 | 0.06 |
| 1:5 | 0.71 | 0.55 | 0.09 |
| 1:6 | 0.79 | 0.64 | 0.12 |
| 1:7 | 0.83 | 0.72 | 0.14 |
| 1:8 | 0.86 | 0.72 | 0.15 |
| 1:9 | 0.88 | 0.76 | 0.16 |

| | | | |
|---|---|---|---|
| 1:10 | 0.88 | 0.76 | 0.17 |
| 1:20 | 0.94 | 0.88 | 0.36 |
| 1:20* | 0.79 | 0.66 | 0.08 |
| Merck kieselgel H only** | 0.46 | 0.30 | 0.10 |

\*) There is a general tendency that the higher the percentage of the powdered glass to adsorbent, the higher becomes the Rf value in a given developing solvent. The polarity of the developing solvent can be lowered by using a solvent system of benzene-ethyl acetate (4:1). The Rf value may be controlled by varying the solvent polarity.

\*\*) The results obtained on thin-layer chromatography plates when prepared by a conventional method under using only Kieselgel H, are also shown for comparison, a developing solvent of benzene-ethyl acetate (2:1) being used in this case.

C. Reproducibility of the Developing and Separating Abilities of the Plates

The chromatography plates are prepared by the procedure described under Item A [i.e., powdered glass : adsorbent = 4:1; adsorbent: (a) Merck Kieselgel H, or (b) Yamani layer PH], developed, and visualized by a conventional manner. They are then soaked in a mixture of bichromate-sulfuric acid and washed out with distilled water and subjected to repeated regeneration-tests after being reactivated by heating at 100° C for 1 hour.

The results of repeated development tests are shown in Tables 2 and 3. Washing and reactivation have to be done, of course, after each run. Activity loss in thin-layer chromatography of the plates is not observed at least up to the end of five successive runs.

Reference materials: three estrogens
Conditions for ascending development:
Temperature; 20° C (room temperature)
Distance; 10 cm
Origin: 2 cm from the bottom edge
Solvent; benzene-ethyl acetate (2:1)

TABLE 2 a) Adsorbent: Kieselgel H

| Run No. | Rf value | | | Time (min.) |
|---|---|---|---|---|
| | Estrone | Estradiol | Estriol | |
| 1 | 0.75 | 0.60 | 0.08 | 20 |
| 2 | 0.74 | 0.58 | 0.09 | 20 |
| 3 | 0.76 | 0.59 | 0.10 | 20 |
| 4 | 0.75 | 0.58 | 0.10 | 20 |
| 5 | 0.70 | 0.54 | 0.09 | 20 |
| Mean | 0.74 | 0.58 | 0.09 | 20 |
| σ* | 0.02 | 0.02 | 0.01 | — |

\*) σ: standard deviation

TABLE 3 b) Adsorbent: Yamani layer PH

| Run No. | Rf value | | | Time (min.) |
|---|---|---|---|---|
| | Estrone | Estradiol | Estriol | |
| 1 | 0.71 | 0.57 | 0.09 | 20 |
| 2 | 0.70 | 0.58 | 0.10 | 21 |
| 3 | 0.72 | 0.60 | 0.08 | 21 |
| 4 | 0.73 | 0.60 | 0.07 | 21 |
| 5 | 0.66 | 0.48 | 0.07 | 20 |
| Mean | 0.70 | 0.57 | 0.08 | 20.6 |
| σ | 0.03 | 0.05 | 0.04 | — |

As shown in Tables 2 and 3, the sintered plates are well suited for repeated use and show good reproducibility even after several regenerations.

EXAMPLE 2

Chromatographic plates are prepared by a process similar to that described under Item A of Example 1, except that porous Vycor* (\* Trade name of a porous high-silicate glass sold by Corning Glass Works. Its lot number was of 7930.) powder is used as the adsorbent in a ratio of 4:1.

A series of repeated developments similar to those described under Item C of Example 1 is carried out using three estrogens as reference samples, and benzene-ethyl acetate (10:1) as developing solvent. The results are summarized in Table 4.

TABLE 4

| Run No. | Rf value | | | Time (min.) |
|---|---|---|---|---|
| | Estrone | Estradiol | Estriol | |
| 1 | 0.62 | 0.36 | 0.02 | 22 |
| 2 | 0.64 | 0.37 | 0.02 | 22 |
| 3 | 0.64 | 0.37 | 0.03 | 23 |
| 4 | 0.60 | 0.37 | 0.02 | 22 |
| 5 | 0.63 | 0.37 | 0.03 | 22 |
| Mean | 0.62 | 0.37 | 0.02 | 22.2 |
| σ | 0.03 | 0.01 | 0.01 | — |

When the polarity of the developing solvent is lowered to overcome the relatively small specific surface area of the porous Vycor powder, 155 m$^2$/g (that of silica gel being in general, 500 m$^2$/g), and to control Rf values, no negative effect is observed in the chromatogram or in the separating ability (chromatographic activity) thereof.

EXAMPLE 3

Chromatographic plates are prepared by a process similar to that described under Item A of Example 1. Merck Aluminum Oxide H (trade name of Merck & Co., Inc.) is used as the adsorbent in a ratio of 1:4 to the powdered glass, followed by the addition of a fluorescing agent, $Zn_2SiO_4$—Mn, in up to 2 percent quantity.

A series of the repeated developments is performed on the plates prepared as above and on those of Merck Aluminum Oxide HF prepared in a usual manner, using various alkaloids as the reference materials to be chromatographed. The results thereof are summarized in Table 5.

Conditions for ascending development:
Temperature; 20° C (room temperature)
Solvent; benzene-chloroform-diethylamine (9:4:1)
Distance; 10 cm
Time; 25 – 26 min.
Origin; 2 cm from the bottom edge
Detection; Ultraviolet irradiation (254 μ)

TABLE 5

| Alkaloid | Rf value | |
|---|---|---|
| | (Adsorbent) Aluminum Oxide H with powdered glass | Merck Aluminum Oxide HF only |
| Codeine | 0.54 | 0.50 |
| Thebaine | 0.82 | 0.90 |
| Atropine | 0.49 | 0.55 |
| Yohimbine | 0.44 | 0.43 |
| Reserpine | 0.58 | 0.68 |
| Ergotamine | 0.28 | 0.23 |
| Brucine | 0.67 | 0.71 |
| Strychnine | 0.72 | 0.73 |
| Nicotine | 0.80 | 0.82 |
| Quinine | 0.55 | 0.46 |
| Cinchonine | 0.57 | 0.59 |
| Aconitine | 0.73 | 0.78 |
| Emetine | 0.76 | 0.75 |
| Caffeine | 0.48 | 0.59 |

EXAMPLE 4

Chromatography plates are prepared in a manner similar to that described under Item A of Example 1. In this example, however, addition of auxiliary binding-agent is omitted. The fine glass powder is mixed with silica gel for chromatography (Merck; Kieselgel H) in the fixed weight-ratio of 4:1 i.e., 4 g of silica gel to 16 g of the powdery glass) and kneaded with the addition of ethanol (34 ml, i.e., 1.7 ml per gram of the solid ingredient).

Table 6 shows the results of development tests on the thus prepared plates in comparison with those by a conventional process using the same adsorbent, Kieselgel H.

Conditions for ascending development:
Temperature; 20° C (room temperature)
Solvent; benzene-ethyl acetate (2:1)
Distance; 10 cm
Time; 20 min.
Origin; 2 cm from the bottom edge
Reference materials; estrogens

TABLE 6

| Type of plate | Rf value | | |
|---|---|---|---|
| | Estrone | Estradiol | Estriol |
| Sintered plate of Example 4 | 0.76 | 0.63 | 0.10 |
| Silica gel plate made by a usual process | 0.46 | 0.27 | 0.10 |

EXAMPLE 5

Fine glass powder is obtained in a manner similar to that described under Item A of Example 1, but in this example, lead silicate glass is used in lieu of the soda-lime glass. Thus formed glass powder has a particle size distribution: 1–2 $\mu$ (14 percent), 2–3 $\mu$ (29 percent), and 3–4 $\mu$ (21 percent), and a specific surface area of 3.1 m²/g.

The glass powder is then mixed with Merck Kieselgel H in a weight ratio of 3:1, and the mixture is kneaded with ethanol (2.0 ml per gram of the solid material) to make a slurry. The slurry is applied on and spread over rectangular plates of soda-lime glass (5 × 20 cm, 1.2 mm thick) with a conventional application apparatus (ca. 10 g of the slurry per 100 cm² of the applied area). The dried plate is then baked at 560° C for 3 minutes in an electric furnace, to obtain white sintered layer of powdered glass (170 $\mu$ thick) embracing the adsorbent, silica gel.

In order to examine the separating ability of the plates obtained and the reproducibility after repeated use and recovery, a series of development tests is carried out as described above. The regeneration can be done by soaking the used plates in a bath of bichromate-sulfuric acid for one hour, followed by water washing and reactivating at 110° C for 30 minutes. The test results are shown in Table 7.

Reference materials: estrogens
Conditions for ascending development:
Temperature; 25° C (relative humidity: 50 – 60 percent)
Solvent; benzene-ethyl acetate (2:1)
Distance; 10 cm
Time; 15 min.
Origin; 2 cm from the bottom edge Reproducibility of hRf value*

TABLE 7

| Times of recovery | hRf value | | |
|---|---|---|---|
| | Estrone | Estradiol | Estriol |
| 0 | 69 | 55 | 10 |
| 1 | 66 | 50 | 9 |
| 2 | 66 | 51 | 8 |
| 3 | 74 | 59 | 9 |
| 4 | 69 | 54 | 8 |
| 5 | 67 | 53 | 8 |
| 6 | 66 | 53 | 9 |
| 7 | 65 | 51 | 8 |
| 8 | 73 | 60 | 10 |
| 9 | 65 | 52 | 8 |
| $\overline{hRf}$ | 68.0 | 53.8 | 8.7 |
| $\sigma$** | 3.2 | 3.5 | 0.8 |
| reproducibility | 68±3 | 54±4 | 9±1 |

*) hRf value: hundredth of the determined Rf value. $\overline{hRf}$: arithmatic mean of the ten hRf values.

**) $\sigma$ : standard deviation of the ten hRf values.

In conventional thin-layer chromatography, in general, reproducibility of Rf value between the limits of the experimental $\overline{hRf}$ value plus/minus 5 is allowable, even under strict control of factors which might affect the reproducibility.

Chromatographic plates prepared by the process of this example, where they contain a fluorescing agent as an ingredient of lead silicate glass, can serve to visualize such a test material having absorption in the ultraviolet region by the so-called quenching method as in conventional thin-layer chromatography (prepared by applying, for instance, Merck Silicagel GF or HF, or Aluminum Oxide GF or HF, with fluorescing agent). In addition to this, they are convenient for regeneration, because the inorganic fluorescing-agents included in the lead silicate glass, are not deactivated by heat-treatment or by spraying hot concentrated sulfuric acid, bichromate-sulfuric acid, and the like.

Example 6

Fine glass powder is obtained in a similar manner to that described under Item A of Example 1, but in this example, a kind of uranium glass (containing 1.8 percent of $U_3O_8$) is substituted for the soda-lime glass. It has its particle size distribution: 1–2 $\mu$ (18 percent), 2–3 $\mu$ (37 percent), and 3–4 $\mu$(15 percent), and a specific surface area of 3.8 m²/g.

The fine powder (0.45 g) is then mixed with powdered soda-lime glass (3g) as described in Example 1 and Merck Kieselgel H (1 g), and kneaded under the addition of 8 ml of acetone to obtain a dense slurry. The slurry is thereafter applied on and spread over rectangular plates of soda-lime glass (5 × 20 cm, 1.2 mm thick) with an applicator. The dried plates are then baked at 670° C for 3 minutes in an electric furnace to obtain white sintered layers of the powdered glass (ca. 200 $\mu$ thick), holding homogeneous adsorbent therein and showing an appearance of greenish-yellow fluorescence when excited under ultraviolet radiation at 253.7 $\mu$.

A piece of this plate is compared with that of Merck Kieselgel GF, using testosterone as the quenching material of fluorescence.

Reproducibility in the developing and separating ability of the plates in such a quenching method is determined and is summarized in Table 8. Visualization is carried out by irradiating the spots with an ultraviolet identifier of 253.7 $\mu$ or by finding the Rf values of the charred spots after spraying with concentrated sulfuric acid. Recovery for subsequent use is done by soaking the developed plates in a bath of bichromate-sulfuric acid for 1 hour, washing, and reactivating at 110° C for 30 minutes.

Test materials: steroids
Conditions for ascending development:
Temperature; 25° C (relative humidity; 50 – 60 percent)
Solvent; chloroform-acetone (4:1)
Distance; 10 CM
Origin; 2 cm from the bottom edge

TABLE 8

| Times of recovery | hRf* value of steroid | | |
|---|---|---|---|
| | Cortisone | Testosterone | Progesterone |

| | | | |
|---|---|---|---|
| 0 | 37 | 59 | 68 |
| 1 | 40 | 60 | 73 |
| 2 | 35 | 57 | 71 |
| 3 | 37 | 54 | 73 |
| 4 | 40 | 60 | 74 |
| hRf | 38 | 58 | 72 |
| $\sigma^*$ | 2 | 3 | 2 |
| reproducibility | 38±2 | 58±3 | 72±2 |

*) The meanings of the signs, hRf, $\overline{hRf}$, and $\sigma$, are the same as in Table 7.

EXAMPLE 7

A. Preparation of Chromatography Plates
1. Powdered glass:
In a similar manner to that described in Item A of Example 1, two kinds of powdered glass are prepared as follows:
  a. Soda-lime glass [particle size distribution; 1–2 $\mu$ (13 percent), 2–3 $\mu$ (25 percent), and 3–4 $\mu$ (18 percent). Specific surface area: 3.5 m²/g].
  b. Lead-silicate glass [consisting of $Pb_3O_4$ (59.6 percent), $SiO_2$ (13.5 percent), $B_2O_3$ (23.1 percent), $Al_2O_3$ (1.5 percent), and $Na_2O$ (2.0 percent). Particle size distribution: 1–2 $\mu$ (14 percent), 2–3 $\mu$ (28 percent), and 3–4 $\mu$ (22 percent). Specific surface area: 3.1 m²/g].
2. Adsorbent used:
  c. Alumina (Merck Type T)
  d. Silica gel (Merck Kieselgel H)
3. Supports: rectangular plates, 50 × 200 mm;
  Titanium (TP 35), 1 mm thick
  Stainless Steel (SUS 27), 0.5 mm thick
  Aluminum (ALP 1 – 0), 1 mm or 2 mm thick
  Iron (SS 41), 1 mm thick
  Brass ($BSP_3$ – 1/4 H), 0.5 mm thick
  Steatite, 2 mm thick Either of the glass powders (a) or (b) and the adsorbent (c) or (d) are mixed together in the ratio of 16 – 20 g/4 g respectively. The mixture is kneaded after adding 40 ml of acetone (about 2 ml per gram of the solid mixture) to obtain a paste-like slurry. Each slurry is then applied on and spread over four supports of each material (3) (total area, 400 cm²) with a conventional application apparatus. The dried plates are baked in an electric furnace to obtain white sintered-layers of the powdered glass with the homogenous adsorbent-phase therein.

The baking can be done at 650° to 700° C for 10 – 20 minutes in the case of soda-lime glass. But heating has to be shortened for 8 minutes at 650° C, when such slurry is coated on aluminum supports. Temperature can be reduced to 450° C for 2 minutes, when lead silicate glass is used as the binder.

B. Results of Developing and Separating Ability Tests
In order to determine the separating ability of the above-prepared plates, a series of developing tests is performed using a mixture of azo-dyes or estrogens as reference materials, each giving good chromatographic separations. Test results are shown in Tables 9, 10, and 11.

Test 1
  Conditions for ascending development:
  Temperature; 25° C, (relative humidity, 50 percent)
  Adsorbent; silica gel
  Solvent; benzene
  Distance; 10 cm

TABLE 9

| Support | Glass (ratio) | Rf value of azo-dye | | | Time (min.) |
|---|---|---|---|---|---|
| | | Indophenol | Sudan Red G | Butter Yellow | |
| Titanium | S-C*(1:4) | 0.12 | 0.22 | 0.55 | 20 |
| Stainless steel | S-C (1:4) | 0.10 | 0.22 | 0.55 | 20 |
| Aluminum (2 mm) | S-C (1:5) | 0.11 | 0.29 | 0.58 | 18 |
| Aluminum (1 mm) | L*(1:4) | 0.10 | 0.21 | 0.57 | 18 |
| Iron | S-C (1:4) | 0.08 | 0.20 | 0.46 | 17 |
| Brass | S-C (1:4) | 0.08 | 0.20 | 0.50 | 17 |
| Steatite | S-C (1:4) | 0.06 | 0.17 | 0.40 | 29 |
| Merck precoated plate | | 0.05 | 0.13 | 0.38 | 25 |

*) S-C: Soda-lime glass, L : Lead silicate glass.

Test 2
  Conditions for ascending development:
  Solvent; benzene-ethyl acetate (2:1)
  Detection; by charring with concentrated sulfuric acid
  Silica gel : soda-lime glass = 1:4
  (Other test conditions are the same as in Test 1).

TABLE 10

| Support | Rf value of estrogen | | | Time (min.) |
|---|---|---|---|---|
| | Estriol | Estradiol | Estrone | |
| Titanium | 0.15 | 0.65 | 0.75 | 17 |
| Stainless steel | 0.13 | 0.62 | 0.76 | 15 |

Test 3
  Conditions for ascending development:
  Solvent; carbon tetrachloride
  Support; titanium
  Alumina : soda-lime glass = 1:4
  (Other test conditions are the same as in Test 1).

TABLE 11

Rf value of azo-dye

| Indophenol | Sudan Red G | Azo-benzene | Sudan Yellow | Butter Yellow | p-Amino-azobenzene | Time (min.) |
|---|---|---|---|---|---|---|
| 0.10 | 0.17 | 0.18 | 0.48 | 0.50 | 0.80 | 32 |

We claim:

1. A chromatographic element for use in plate or thin layer chromatography, which comprises a porous sintered layer of powdered glass on a support of refractory and chemically stable material, wherein said sintered layer of glass particles contains distributed throughout the glass particles, a finely-divided and chromatographically-active inorganic adsorbent, the glass particles being firmly bonded to each other, to the adsorbent particles and to the support.

2. A chromatographic element as claimed in claim 1, wherein said glass is selected from the group consisting of soda-lime glass, borosilicate glass, lead silicate glass, high silicate glass, uranium glass, and mixtures thereof.

3. A chromatographic element as claimed in claim 1, wherein said refractory and chemically-stable material is selected from group consisting of glass, metal, and ceramic materials.

4. A chromatographic element as claimed in claim 1, wherein said chromatographically-active inorganic adsorbent is selected from the group consisting of silica gel, alumina, diatomaceous earth, magnesium silicate, and porous high silicate glass powder.

5. A chromatographic element as claimed in claim 1, wherein the ratio of the powdered glass to the adsorbent is between 1:1 to 30:1 by weight.

6. A chromatographic element as claimed in claim 1, wherein the ratio of the powdered glass to the adsorbent is between 2:1 to 10:1 by weight.

7. A chromatographic element as claimed in claim 1, wherein the sintered layer has a thickness of from about 150$\mu$ to about 2 mm.

8. A method for producing a chromatographic element for use in plate or thin-layer chromatography, which comprises mixing a chromatographically-active inorganic adsorbent with powdered glass, kneading the solid mixture with a small amount of a volatile solvent, applying the kneaded mixture on and spreading over the surface of a support of refractory and chemically-stable material, and then baking the applied support at a temperature the same or higher than the melting-point where the glass beings to melt.

9. A method as claimed in claim 8, wherein said chromatographically-active inorganic adsorbent is selected from the group consisting of silica gel, alumina, diatomaceous earth, magnesium silicate and porous high silicate glass powder, and is powdered and sieved before mixing with the powdered glass binder.

10. A method as claimed in claim 8, wherein said powdered glass is prepared by crushing a material selected from the group consisting of soda-lime glass, borosilicate glass, lead silicate glass, uranium glass, and high silicate glass, followed by elutriation and sieving through a screen such that the particle size of said powdered glass is similar to or the same as that of the adsorbent.

11. A method as claimed in claim 8, wherein said volatile solvent is selected from the group consisting of benzene, ketones, alcohols, water and mixtures thereof.

12. A method as claimed in claim 8, wherein said support is made of a refractory and chemically-stable material selected from the group consisting of glass, metal, and ceramic material, and is formed as a rectangular strip before the application of the kneaded mixture.

13. A method as claimed in claim 8, wherein another binding agent is homogeneously added to the mixture to be applied.

14. A method as claimed in claim 8, wherein said baking is effected in an electric furnace to keep said element free of any contamination.

15. A method as claimed in claim 8, wherein the ratio of the powdered glass to the adsorbent is between 1:1 to 30:1 by weight.

16. A method as claimed in claim 8 wherein the ratio of the powdered glass to the adsorbent is between 2:1 to 10:1 by weight.

17. A method as claimed in claim 8, wherein the kneaded mixture applied to the support has a thickness of about $150\mu$ to about 2 mm.

* * * * *